No. 698,095. Patented Apr. 22, 1902.
B. H. ALVEY.
SKID.
(Application filed Mar. 12, 1901.)
(No Model.)
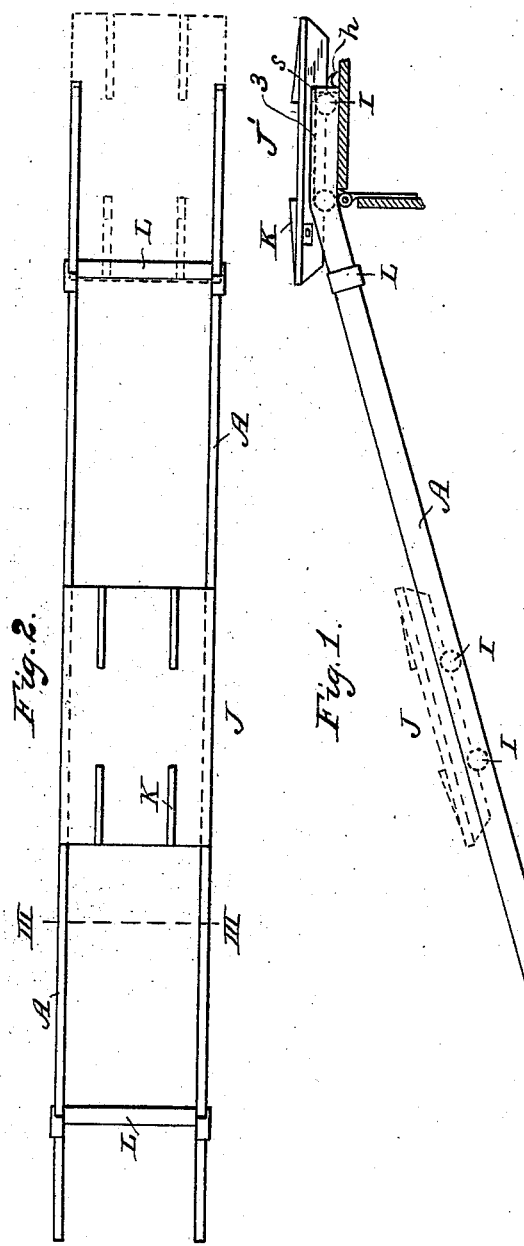
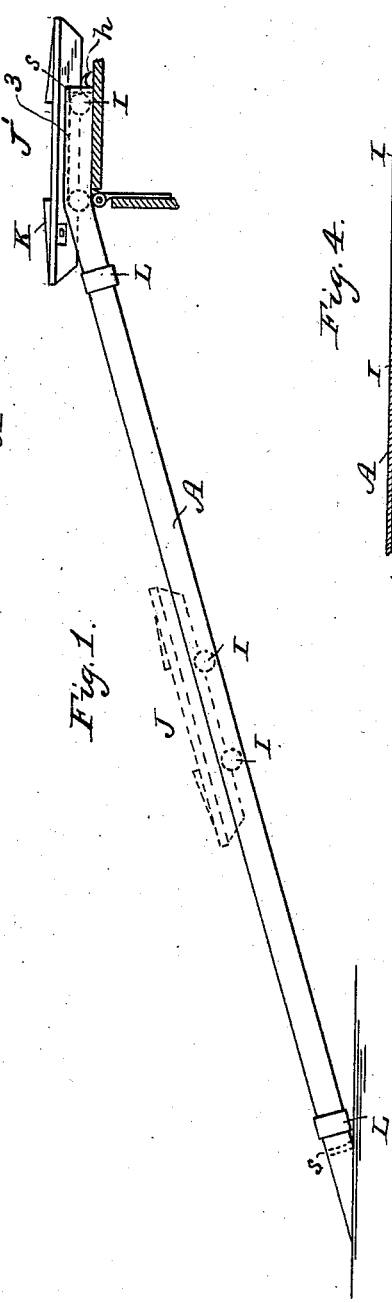
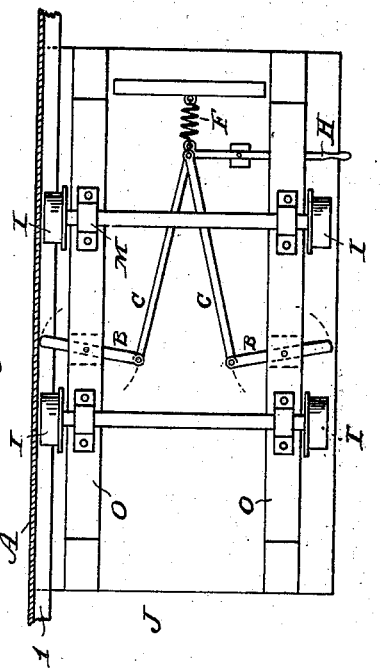
Witnesses
L. M. Low
A. B. Griffith
Inventor
Benjamin H. Alvey,
by H. N. Low
atty

UNITED STATES PATENT OFFICE.

BENJAMIN H. ALVEY, OF LOUISVILLE, KENTUCKY, ASSIGNOR TO THE ALVEY-FERGUSON CO., OF LOUISVILLE, KENTUCKY, A CORPORATION OF KENTUCKY.

SKID.

SPECIFICATION forming part of Letters Patent No. 698,095, dated April 22, 1902.

Application filed March 12, 1901. Serial No. 50,840. (No model.)

*To all whom it may concern:*

Be it known that I, BENJAMIN H. ALVEY, a citizen of the United States, residing at Louisville, in the county of Jefferson, State of Kentucky, have invented certain new and useful Improvements in Skids; and I do declare the following to be a full, clear, and exact description of the invention, such as will enable others skilled in the art to which it appertains to make and use the same.

My invention relates to skids for loading and unloading wagons and other vehicles and lifting and lowering barrels, boxes, and other heavy articles to and from a raised platform; and my improvement relates more particularly to the means for directing the travel of a conveying platform or truck on a frame or guideway and for controlling the backward movement of the same.

The invention consists in the parts and combinations thereof hereinafter set forth.

In order to make the invention more clearly understood, I have shown in the accompanying drawings means for carrying the same into practical effect without limiting the improvements in their useful applications to the particular construction which for the sake of illustration has been delineated.

In said drawings, Figure 1 is a side elevation of the improved skid and truck. Fig. 2 is a plan view of the same. Fig. 3 is a transverse section on line III III, Fig. 2. Fig. 4 is a bottom view of the truck, showing the arrangement of the wheels and brake.

Referring to the drawings, A A are the sides of the skid, channeled on the inside to admit the truck-wheels and keep the same in place, and are preferably made of steel or other metal.

L L are braces holding the sides of the skid firmly in position. Other braces may be added at other points connecting the sides of the skid. The upper ends of the skid are bent, substantially as shown in the drawings, in such manner as to cause the upper end of the truck to be lowered when it reaches the upper end of the skid, as at J', and thus facilitate the delivery and receipt of heavy articles to and from the wagon or other platform. The lower portion of the channels 1 furnish a supporting-surface 2, on which the wheels travel, while the upper portion of the channels have guide-walls 3 at an angle to the surfaces 2 and overhanging the wheels to limit the upward movement of the forward truck-wheels, hold them on their track, and bring the truck to a delivery position. The upper end of the skid may be supported by resting the ends of the side bars A on the wagon or other support or by attaching it by hooks $h$ or other device. The truck J, consisting of parallel beams O O, upon which is attached a platform with cleats K to hold barrel or other article in place, has four wheels I, connected in pairs by axles held in place by cleats M, and is intended to run up and down the skid, with the wheels I resting in the channeled skid sides A A. Suitable stops $s$ are provided at or near the ends of the skids in order to prevent the truck leaving the skid. A double lever-brake C B, with handle H and spring F, operates to hold the truck from retrograde movement, the brake-shoes being constantly held against the sides A within the channels 1 by said spring, and the handle H being used to increase, reduce, or remove the pressure of the brakes on those sides. The brake-shoes are pivoted to the truck and so arranged that during the upward movement of the truck they will slide along the sides A; but a downward movement of the truck will cause them to stick and be pressed outward more tightly, thus locking the truck and load.

When loading, the lower end of the skid A rests upon the ground and the upper end rests upon or is hooked to the wagon or other platform, the truck J is lowered to receive the article to be elevated to the wagon or other platform, the brake-lever, if necessary for that purpose, being moved to regulate or release the pressure of the brakes upon the channeled sides of the skid. The truck being loaded is then pushed to the tail of the wagon or other platform for delivery of the load there, and it may be brought to a rest at any point in the ascent by the automatic action of the lever-brake, or, if need be, by additional force applied to the lever-handle, the pressure of the brakes upon the sides of the skid A by their adjustment, as shown in Fig. 4, being wholly or partially removed when the truck moves upgrade, to the left in Fig. 4.

I am aware that it has been proposed to form the side members of a skid with straight channels to receive the truck-wheels, also to bend the upper ends of skid-tracks so as to aid in bringing the truck to a delivery position by gravity; but I believe myself to be the first to provide the upper ends of the skid-tracks with means, such as the walls 3, to bring the skid-truck to a delivery position positively and irrespectively of the position of the load or of the action of gravity.

Having thus described my invention, what I claim is—

1. In a skid the combination with the truck having two pairs of lateral wheels, of the side pieces or sills A adapted to be upwardly inclined to a wagon or other point of delivery and formed with lateral channels in which said wheels are held from any movement lateral to the truck, the said channels having a bend at the upper end whereby the upper pair of wheels is positively deflected below the normal path of travel and relative to the rear pair to bring the truck to a delivery position, substantially as set forth.

2. In a skid the combination with the truck having two pairs of lateral wheels, of the side pieces or sills A adapted to be upwardly inclined to a wagon or other point of delivery and having the wheel-supporting surfaces 2 and the overhanging walls 3 at an angle to the surfaces 2.

3. In a skid the combination with the truck having two pairs of lateral wheels, of two U-beams constituting sides A arranged with their channels opposite each other to receive said wheels, said beams being bent to form overhanging walls 3 at an angle to the supporting-surfaces 2.

4. In a skid the combination with the supporting or inclined portion, of a truck fitted to travel thereon and brake-shoes carried by the truck and bearing laterally against said inclined portion, said shoes having their engaging portions nearly in line with but a little back of their pivots so as to automatically set upon the retrograde movement of the truck.

5. In a skid the combination with the supporting or inclined portion, of a truck fitted to travel thereon, brake-shoes pivoted on the truck and bearing laterally against said inclined portion, a spring for holding said shoes in contact with said inclined portion, and means for releasing said shoes.

In testimony whereof I affix my signature in the presence of two witnesses.

BENJAMIN H. ALVEY.

Witnesses:
TEMPLE BODLEY,
MENEFEE WIRGMAN.